US006444348B1

(12) United States Patent
Saijo et al.

(10) Patent No.: US 6,444,348 B1
(45) Date of Patent: Sep. 3, 2002

(54) BATTERY SEALING PLATE COATED WITH PROTECTIVE FILM AND BATTERY SEALED WITH THE SAME

(75) Inventors: Kinji Saijo, Yamaguchi-ken; Hiromasa Suzuki, Osaka, both of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/445,226

(22) PCT Filed: Jun. 5, 1998

(86) PCT No.: PCT/JP98/02509

§ 371 (c)(1), (2), (4) Date: Mar. 2, 2000

(87) PCT Pub. No.: WO98/56052

PCT Pub. Date: Dec. 10, 1998

(30) Foreign Application Priority Data

Jun. 5, 1997 (JP) ........................................... 9-162027

(51) Int. Cl.[7] ................................................ H01M 2/12

(52) U.S. Cl. ............................ 429/53; 429/56; 429/57; 429/72; 429/82; 429/231.95; 429/163; 429/171; 429/174; 429/175; 429/177

(58) Field of Search ............................. 429/53, 56, 57, 429/72, 82, 175, 171, 231.95, 163, 174, 177

(56) References Cited

U.S. PATENT DOCUMENTS 6,132,900 A * 10/2000 Yoshizawa et al. ......... 429/185

FOREIGN PATENT DOCUMENTS

| | | | |
|---|---|---|---|
| JP | 46-004342 | 2/1971 | |
| JP | 02-284349 | 11/1990 | |
| JP | 2-284349 A | * 11/1990 | ............ H01M/2/04 |
| JP | 07-169452 | 7/1995 | |
| JP | 410241651 A | * 9/1998 | ............ H01M/2/12 |

* cited by examiner

*Primary Examiner*—Patrick Ryan
*Assistant Examiner*—Angela J Martin
(74) *Attorney, Agent, or Firm*—Browdy and Neimark

(57) ABSTRACT

A closing plate for a battery comprises a metal substrate provided with a safety valve at a peripheral portion thereof. The safety valve is protected by applying a protection film to the metal substrate of the closing plate. The closing plate comprises a metal substrate, metal foil which is adhered to the lower surface of the metal substrate, and a protection film attached to the upper surface of the metal substrate, which protection film has previously been provided with a cut in a prescribed shape.

8 Claims, 5 Drawing Sheets

BATTERY SEALING PLATE COATED WITH PROTECTIVE FILM AND BATTERY SEALED WITH THE SAME

CROSS REFERENCE TO RELATED APPLICATION

The present application is the national stage under 35 U.S.C. 371 of PCT/JP98/02509, filed Jun. 5, 1998.

FIELD OF THE INVENTION

The present invention relates to a closing plate of a battery provided with a safety valve for explosion-proof of a closed battery, wherein protection of the safety valve is achieved by applying a protection film to a metal substrate of the closing plate so that the explosion-proof mechanism of the safety valve may not suffer damage, and relates to a battery using it.

BACKGROUND OF THE INVENTION

With an increasing demand for electronic devices that are made much smaller in size, are portable and have enhanced performance, closed batteries with high energy density have been more popularly used as power sources for such electronic devices. Since the closed battery uses an alkali metal such as lithium as a material for positive and negative electrodes thereof, its outer container has a sealed structure so that the alkali metal such as lithium may not react with water in the atmosphere.

Such a closed battery of a sealed structure the advantage of being storable, but conversely, it is not free from problems resulting from the very high sealability thereof. That is, if the closed battery is exposed to high temperature or mishandled, the internal pressure thereof is sometimes abnormally elevated, which causes the battery itself to burst.

For instance, when the battery if supplied with more than a rated current to be overcharged, or is mishandled to short circuit the positive electrode terminal and the negative electrode terminal thereof, inducing a large current in the battery, the electrolyte is sometimes decomposed to generate gas in the battery container of such sealed structure as mentioned above. If the battery container is filled with such gas, the internal pressure of the battery is abnormally elevated and the closed battery itself may finally burst.

There is so far known a closing plate of a battery provided with an explosion-proof prevention mechanism or a safety valve for releasing such generated gas so as to prevent the burst of the closed battery as mentioned above. For example, Japanese Patent Laid-open Publication No. HEI-5-84025 teaches a safety valve device for a closed battery in which a positive electrode terminal constituting a closing plate of a battery, is provided with a gas releasing hole, and to which a metal foil is welded for making the device explosion-proof. In this disclosure, the closing plate is provided with a safety valve functioning such that if the internal pressure of the battery is elevated, the above mentioned metal foil ruptures so as to release the internal pressure through the above mentioned gas releasing hole of the positive electrode terminal, thereby reducing the internal pressure.

However, in the above mentioned closing plate provided with the safety valve, the metal ion is made extremely thin, so there arises a problem of the metal foil easily rupturing by even a common impact.

For instance, when the closing plate is assembled into a battery in the manufacturing operation for completion of a closed battery, or when a user inserts a battery into an eletronic device, impact is erroneously applied to the safety valve, which sometimes damages the safety valve.

Therefore, it is an object of the present invention to provide a closing plate of a battery, wherein protection for a safety valve is achieved by a relatively simple means of attaching a protection film to a metal substrate of the closing plate so that the explosion-proof mechanism of the safety valve may not suffer damage in normal handling.

SUMMARY OF THE INVENTION

To achieve the above mentioned object, there is provided a closing plate of a battery, the surface of which is covered with a protection film.

Further, there is provided a closing plate of a battery in which the protection film has previously been provided with a cut.

There is also provided a closing plate of a battery comprising a metal surface, a metal foil which is laminated to the lower surface of said metal substrate, and a protection film attached to the upper surface of said metal substrate and which protective film has previously provided with a cut in a prescribed shape.

Further, there is provided a battery using any of the closing plates as described above.

DETAILED DESCRIPTION OF THE INVENTION

The closing plate of a battery of the present invention is now explained below with reference to the drawings.

EXAMPLE 1

Figure 1A:
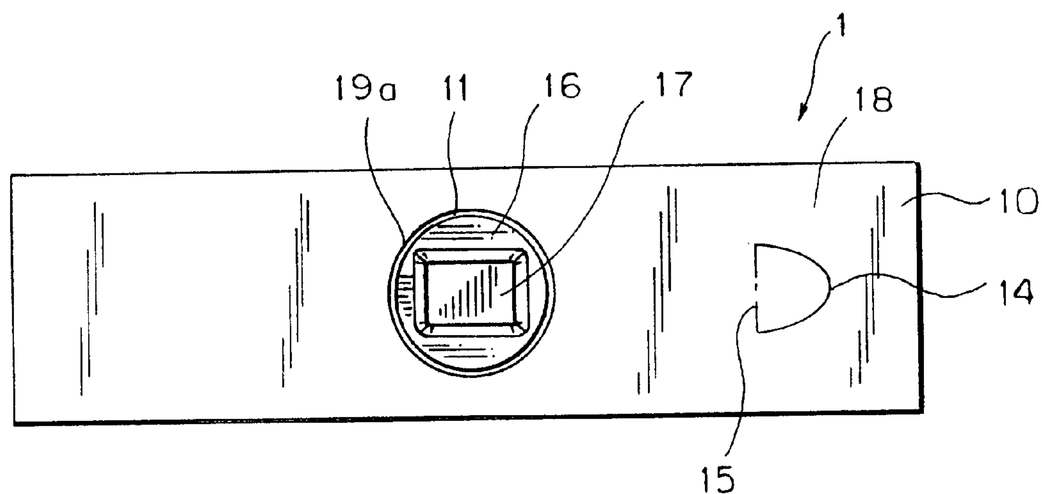
FIG. 1 is a front view and a section thereof showing a closing plate provided with a protection mechanism for a safety valve for use in a square-shaped battery.
Figure 1B:
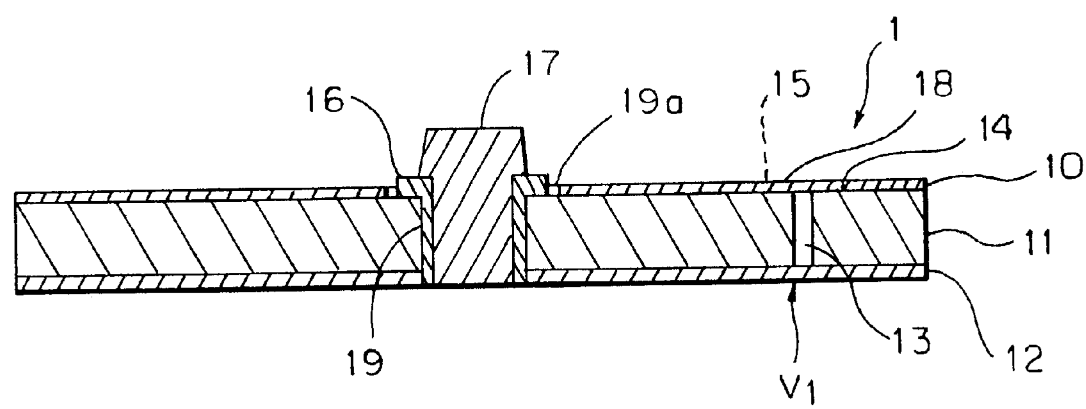

FIG. 1 shows an example where the closing plate of the present invention is applied to a square-shaped battery.

As shown in FIG. 1, a closing plate 1 provided with a protection mechanism for a safety valve comprises a hexahedral terminal 17 to serve as a positive electrode terminal, an insulating gasket 16, a protection film 10 formed in a prescribed shape, a metal substrate 11, and a metal foil 12. The closing plate 1 is formed in a rectangular shape so that it may be consistent with the configuration of an open end portion A of the square-shaped battery.

Further, the metal substrate 11 of the closing plate 1 is provided with a circular opening 13 for gas releasing, which constitutes a safety valve V1, at a peripheral portion 18 thereof, and the metal foil 12 is laminated to the lower surface of the metal substrate and the protection film 10 formed in a prescribed shape is attached to the upper surface of the metal substrate 11.

At the central portion of the metal substrate 11, a circular electrode opening 19 is perforated through the entire thickness of the metal substrate 11 and the metal foil 12 for receiving therein the hexahedral terminal 17 which is to serve as a positive electrode terminal of a battery.

On the other hand, the protection film 10 is provided with an electrode opening 19a which is a size larger than the above mentioned electrode opening 19. The above-mentioned hexahedral terminal 17 to serve as a positive electrode of a battery has an upper part thereof which is hexahedral so as to form the positive electrode, and a lower part thereof which is cylindrical so as to be received in the above-mentioned circular electrode opening 19 together with the insulating gasket 16.

The above-mentioned safety valve V1 consists of the opening 13 for gas releasing perforated in the metal substrate 11 and a portion of the metal foil 12 which is exposed in the above mentioned opening for gas releasing. The protection film 10 is previously provided with a cut 14, in a tongue-like shape, for example, so that the safety valve may not suffer damage to its own mechanism.

Figure 2:
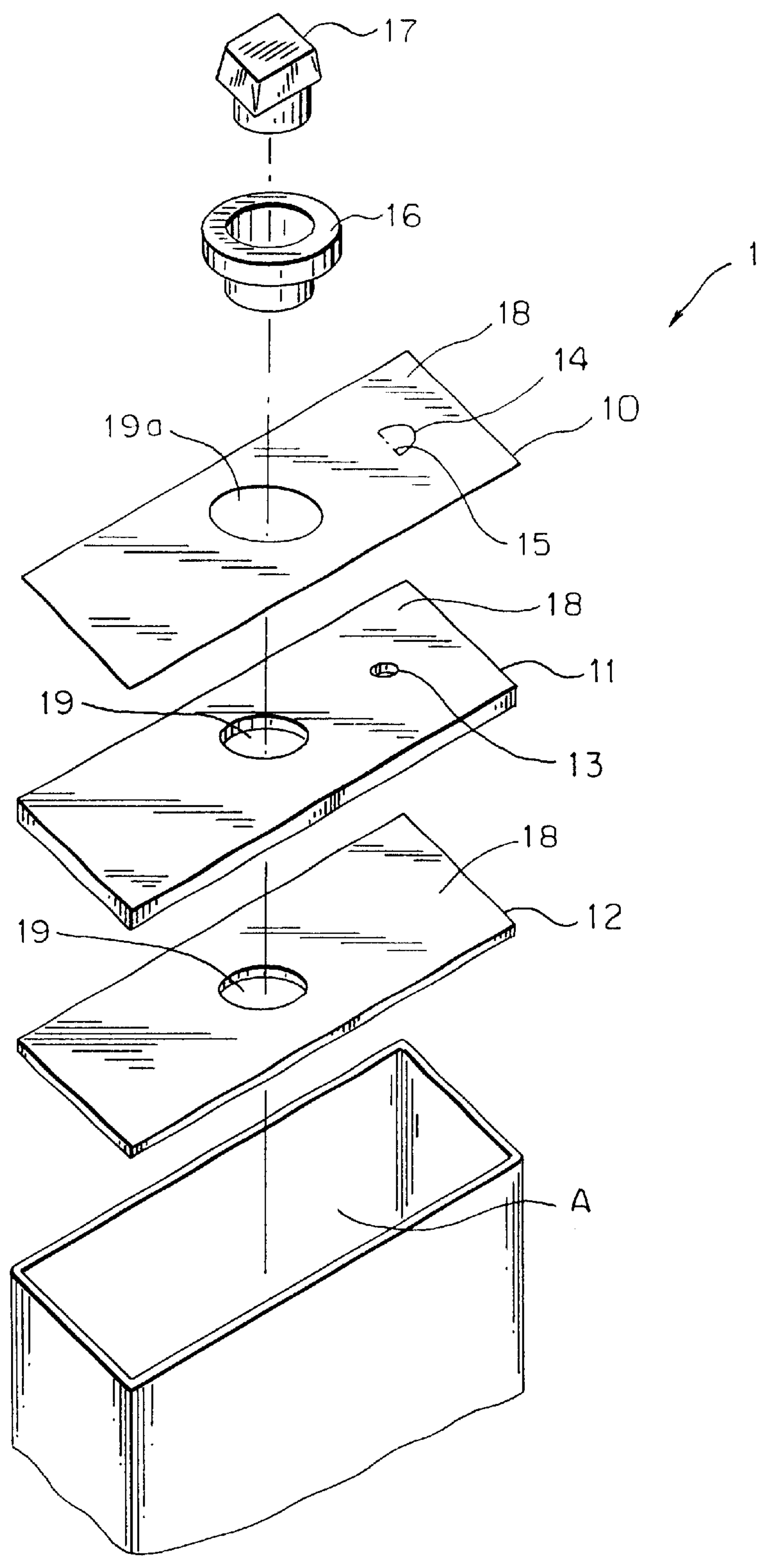
FIG. 2 is an exploded perspective view of the closing plate for the square-shaped battery.

FIG. 2 is an exploded perspective view of the closing plate of to FIG. 1. As shown in FIG. 2, the closing plate 1 comprises the hexahedral terminal 17 which serves as a positive electrode terminal of a battery, the insulating gasket 16, the protection film 10 formed in a desired shape, the metal substrate 11, and the metal foil 12.

The terminal which serves as a positive electrode terminal of a battery may have a cylindrical shape, for example, other than the hexahedral terminal as shown in FIG. 2, as long as it does not lose the function as the terminal. The hexahedral terminal 17 which serves as a positive electrode terminal battery is inserted in the circular electrode opening 19 together with the insulating gasket 16 and then caulked to the metal substrate 11 to which the metal foil 12 is laminated.

EXAMPLE 2

Figure 3A:
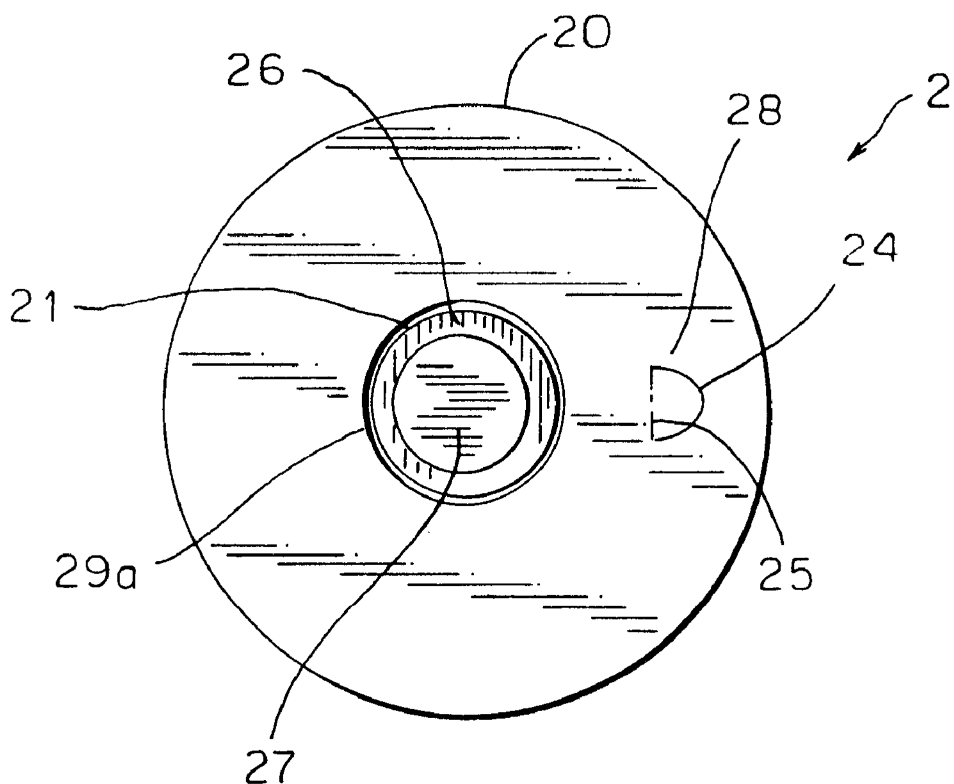
FIG. 3 is a front view and a section thereof showing a closing plate provided with a protection mechanism for a safety valve for use in a cylinder-shaped battery.
Figure 3B:
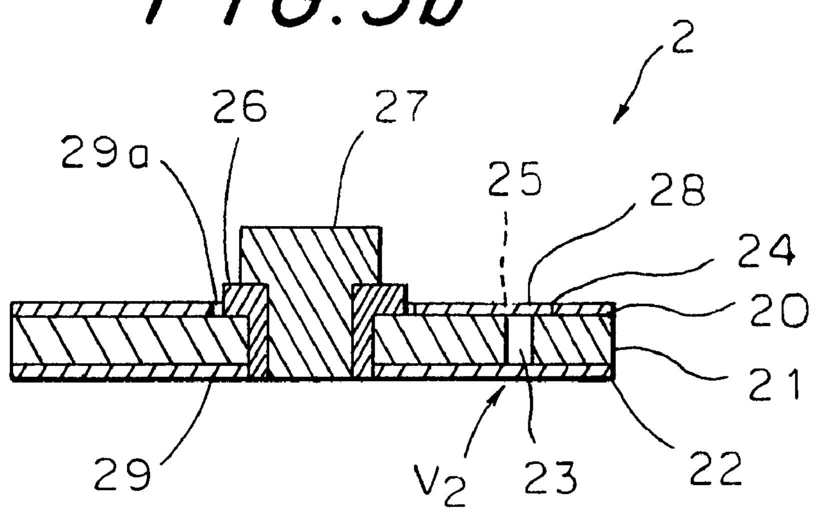

FIG. 3 shows another example where the closing plate of the present invention is applied to a cylindrical battery.

As shown in FIG. 3, a closing plate 2 provided with a safety valve protection mechanism comprises a cylindrical terminal 27 which serves as a positive electrode terminal of a battery, an insulating gasket 26, a protection film 20 formed in a desired shape, a metal substrate 21, and a metal foil 22. The closing plate 2 is formed in a circular so as to be consistent with the configuration of an open end portion B of the cylinder-shaped battery.

Further, the metal substrate 21 of the closing plate 2 is provided with a circular opening 23 for gas release, which constitutes a safety valve V2, at a peripheral portion 28 of the cloning plate and wherein the metal foil 22 is laminated to the lower surface of the metal substrate 21. The protection film 20 formed in a prescribed shape is attached to the upper surface of the metal substrate 21.

At the central portion of the metal substrate 21, a circular electrode opening 29 is perforated through the entire thickness of the metal substrate 21 and the metal foil 22 so as to receive therein the cylindrical terminal 27 to serve as a positive electrode terminal of a battery.

On the other hand, the protection film 20 is provided with an electrode opening 29*a* which is a size larger than the above mentioned electrode opening 29. The cylindrical terminal 27 to serve as a positive electrode terminal of a battery has a hexahedral upper part thereof so as to form the positive electrode terminal and a lower part thereof cylinder-shaped so as to be received in the circular electrode opening 29 together with the insulating gasket 26. The safety valve V2 comprises an opening 23 for gas releasing which is perforated through the metal substrate 21, and a portion of the metal foil 22 which is exposed in the above mentioned opening 23. The protection film 20 has previously been provided with a cut 24, for example in a tongue like form, so that the safety valve 72 is not damaged.

Figure 4:
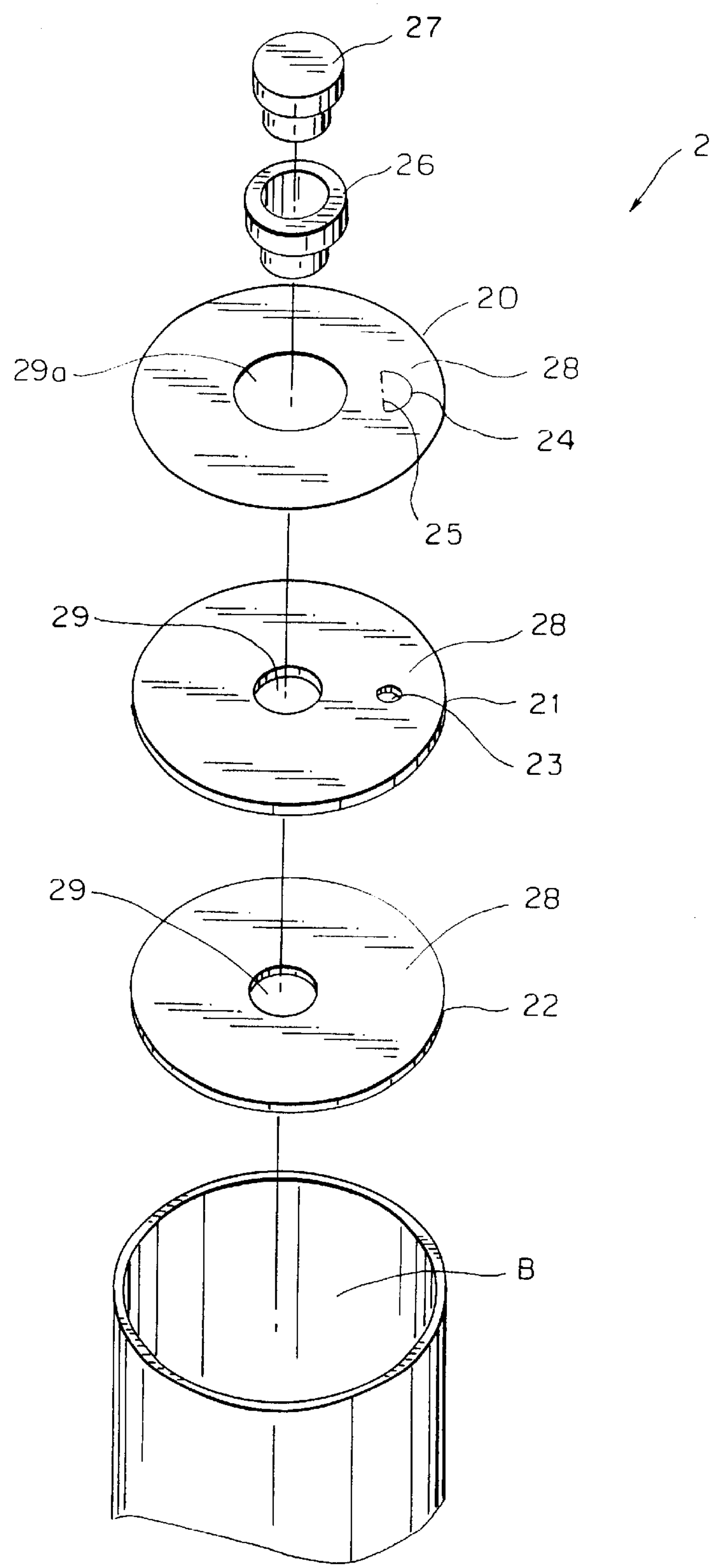
FIG. 4 is an exploded perspective view of the closing plate for the cylinder-shaped battery.

FIG. 4 is an exploded perspective view of the closing plate 2 as explained with regard to FIG. 3. As shown in FIG. 4, the closing plate 2 comprises a cylindrical terminal 27 which serves as a positive electrode terminal of a battery, the insulating gasket 26, the protection film 20 formed in a desired shape, the metal substrate 21, and metal foil 22.

The terminal which serves as a positive electrode terminal of a battery may have a hexahedral shape, for example, other than the cylindrical terminal as shown in FIG. 4, as far as it does not lose the function as a terminal. The hexahedral terminal 27 which serves as a positive electrode terminal of a battery is inserted in the circular electrode opening 29 together with the insulating gasket 26 and then caulked to the metal substrate 21 to which the metal foil 22 is laminated.

In such construction as above mentioned, even if an impact is erroneously applied to the closing plate 1 when the battery is being handled in common manners, for instance at the time of assembling the closing plate 1 of the example 1 into battery to complete a closed battery as a final product, or when a user lost the battery of the example 1 into an electronic device, the protection film 14 will absorb the impact so that the safety valve V1 can be free from damage. Further, since the exposed portion of the metal foil 12 in the opening 13 for gas releasing, which constitutes the safety valve V1, is never touched directly because of the provision of the protection film, it is possible to prevent this exposed portion of the metal foil 12 from breaking. The protection film also prevents a foreign matter from entering into the circular opening 13 for gas releasing which constitutes the safety valve V1 so that the safety valve V1 can be free from damage. Further, since the exposed portion of the metal foil 12 in the opening 13 for gas releasing is not directly exposed to the atmosphere, it is rarely subjected to corrosion even under an acidic environment, for instance. Therefore, it is possible to retain the mechanism of the safety valve V1 for a relatively long period, which provides an improvement in the life of the battery.

Figure 5:
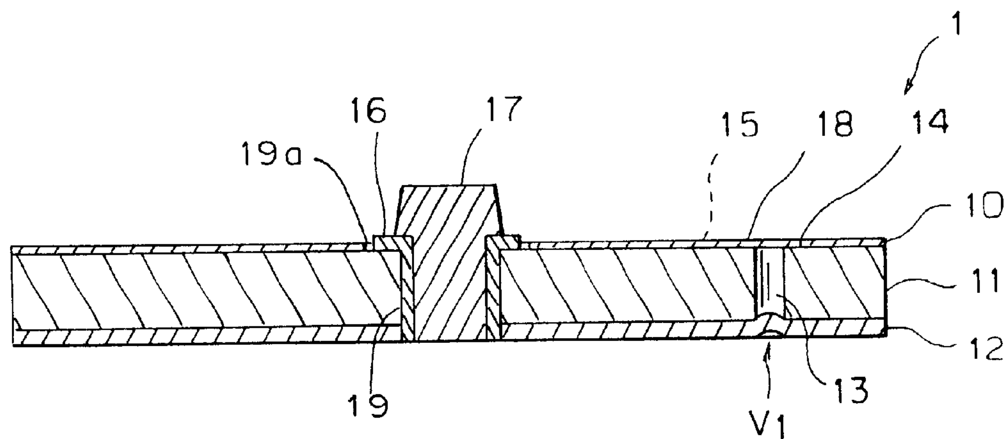
FIG. 5 is an explanatory view A showing an operation manner of the safety valve mechanism for use in the square-shaped battery.
Figure 6:
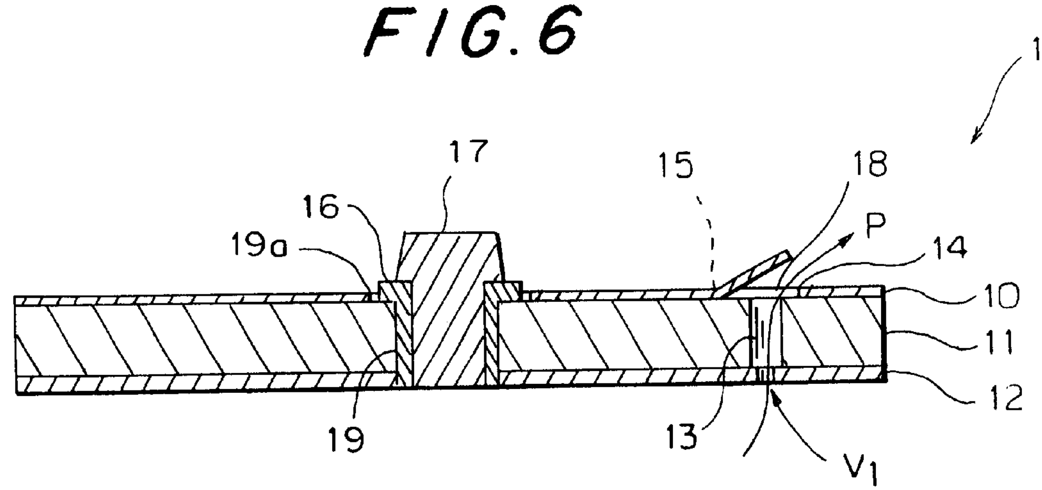
FIG. 6 is an explanatory view B showing another operation manner of the safety valve mechanism for use in the square-shaped battery.

On the other hand, as shown in FIG. 5, if a case occurs in which the electrolyte of the battery is decomposed to generate gas due to overcharging of the battery or the like, the generated gas will fill the container of the battery whereby the internal pressure thereof will be elevated. The elevated internal pressure will be propagated to the metal foil 12 which constitutes the closing plate 1 of the battery. Since the metal foil 12 is laminated to the lower surface of the metal substrate 11 and constitutes the closing plate 1 together with the metal substrate 11, and both of these are fixed to the open end portion A of the square-shaped battery, the exposed portion of the metal foil 12 in the opening 13 for gas releasing will be deformed by the pressure of the generated gas. When the pressure reaches to a prescribed value, the deformed portion ruptures to release the generated gas (P) outside, as shown in FIG. 6, so that the internal pressure can be reduced.

At this time, since the protection film 10 has previously been provided with the tongue-like cut 14, there is formed a fulcrum portion 15 and the tongue-like cut 14 is raised up by the pressure of the generated gas with the fulcrum portion 15 as a base. This is why the protection film 10 provided on the metal substrate 11 does not obstruct release of the gas.

As a film usable for the protection film of the present invention, any resin generally available can be used, irrespective of the type of the resin. In particular, the following resins may preferably be used in view of the adhesion to the metal substrate.

Namely, any one resin selected from the group including polyethylene resin, polypropylene resin, polyester resin, polyamide resin, polycarbonate resin, polyvinyl chloride resin, polyvinylidene chloride resin, and acrylic resin may be used. Otherwise, a copolymer resin composed of two or more than two resins selected from the above mentioned group, or a compound resin blended from two or more than two resins selected from the above mentioned group may be used.

If such resin is insufficient in the adhesion to the metal substrate, another step will be required. That is, a thermosetting adhesive such as phenol epoxy group adhesive may be applied to the surface of the metal substrate and then the resin film is laid on it, or the thermosetting adhesive may be applied to one surface side of the resin film to be bonded to the metal substrate in advance.

The thickness of the resin film may preferably be 5 to 50 $\mu$m in general and more preferably 10 to 25 $\mu$m.

According to the present invention, a closing plate of a battery comprises a metal substrate provided with a safety valve at a peripheral portion thereof, wherein protection for the safety valve is achieved by a relatively simple means of applying a protection film to the metal substrate of the closing plate. Thus, it is possible to provide such closing plate of a battery capable of protecting the safety valve against impact so that the explosion-proof mechanism of the safety valve may not suffer damage, even if the closing plate or the battery suffers any impact due to common mishandling, for instance, at the time of assembling the closing plate to complete a closed battery, or when a user loads the battery into an electronic device.

EXPLANATION OF REFERENCE CHARACTERS

1: dosing plate of battery

10: protection film

11 metal substrate

12: metal foil

13 opening for gas releasing

14 cut

15 fulcrum portion

16 insulating gasket

17 positive electrode terminal of battery

18 peripheral portion of metal substrate

19 electrode opening

**19*a*** electrode opening

V1: safety valve

P: generated gas

A: open end portion of square-shaped battery

What is claimed is:

1. A closing plate for a battery comprising a metal substrate, metal foil which is laminated to the lower surface of the metal substrate, and a protection film attached to the upper surface of the metal substrate, wherein said protection film is provided with a cut in a tongue-like form.

2. A closing plate for a battery comprising a metal substrate, a metal foil laminated to the lower surface of the metal substrate, thermosetting adhesive attached to the upper surface of the metal substrate, and a protection film attached to the upper surface of the thermosetting adhesive, wherein the protection film has a cut in tongue like form.

3. The closing plate for a battery according to claim 1 wherein said protection film is made of a material selected from the group consisting of polyethylene resins, polypropylene resins, polyester resins, polyamide resins, polycarbonate resins, polyvinyl chloride resins, polyvinylidene chlorides resins, and acrylic resins.

4. The closing plate for a battery according to claim 2 wherein said protection film is made of a material selected form the group consisting of polyethylene resins, polypropylene resins, polyester resins, polyamide resins, polycarbonate resins, polyvinyl chloride resins, polyvinylidene chlorides resins, and acrylic resins.

5. A battery comprising a closing plate according to claim 1.

6. A battery comprising a closing plate according to claim 2.

7. A battery comprising a closing plate according to claim 3.

8. A battery comprising a closing plate according to claim 4.

* * * * *